(12) United States Patent
Kawakatsu

(10) Patent No.: US 10,211,717 B2
(45) Date of Patent: Feb. 19, 2019

(54) POWER SUPPLY DEVICE AND IMAGE FORMING APPARATUS

(71) Applicant: CANON KABUSHIKI KAISHA, Tokyo (JP)

(72) Inventor: Jun Kawakatsu, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/829,512

(22) Filed: Dec. 1, 2017

(65) Prior Publication Data

US 2018/0159419 A1 Jun. 7, 2018

(30) Foreign Application Priority Data

Dec. 6, 2016 (JP) ................................. 2016-237118

(51) Int. Cl.
*H02M 1/08* (2006.01)
*G03G 15/00* (2006.01)
*H02M 3/335* (2006.01)
*H02M 3/158* (2006.01)
*H02M 1/00* (2006.01)

(52) U.S. Cl.
CPC .............. *H02M 1/08* (2013.01); *G03G 15/80* (2013.01); *H02M 3/158* (2013.01); *H02M 3/33546* (2013.01); *H02M 3/33569* (2013.01); *H02M 2001/007* (2013.01); *H02M 2001/0032* (2013.01)

(58) Field of Classification Search
CPC ......... H02M 3/33523; H02M 3/33538; H02M 3/33546; H02M 3/33553
See application file for complete search history.

(56) References Cited

U.S. PATENT DOCUMENTS

| 6,118,676 | A  | * | 9/2000 | Divan | H02J 3/1814 323/207 |
| 7,920,392 | B2 | * | 4/2011 | Schneider | H02J 3/1814 307/105 |
| 8,558,517 | B2 | * | 10/2013 | Liquicia | H02M 1/32 323/224 |
| 8,576,590 | B2 | * | 11/2013 | Kawakatsu | H02M 3/33507 363/63 |
| 9,231,479 | B2 | * | 1/2016 | Yamada | H02M 3/335 |
| 2010/0149840 | A1 | * | 6/2010 | Hayasaki | H02M 3/3381 363/21.09 |

(Continued)

FOREIGN PATENT DOCUMENTS

| JP | 2009-142052 A | 6/2009 |
| JP | 2013-38941 A | 2/2013 |

(Continued)

*Primary Examiner* — Timothy J Dole
*Assistant Examiner* — Sisay G Tiku
(74) *Attorney, Agent, or Firm* — Canon U.S.A., Inc. IP Division

(57) ABSTRACT

A power supply device includes a switching unit configured to switch to a first path in which a current smoothed by a smoothing unit is supplied to a boost converter and to a second path in which the smoothed current is supplied to a load without passing through the boost converter. The switching unit includes a first switching element to be turned on and a second switching element to be turned off when the first path is formed.

14 Claims, 7 Drawing Sheets

(56) References Cited

U.S. PATENT DOCUMENTS

| | | | | |
|---|---|---|---|---|
| 2011/0222318 A1* | 9/2011 | Uno | ............ | H02M 1/4225 |
| | | | | 363/21.05 |
| 2011/0285375 A1* | 11/2011 | Deboy | ............ | G05F 1/67 |
| | | | | 323/299 |
| 2017/0170784 A1* | 6/2017 | Huang | ............ | H03B 1/04 |

FOREIGN PATENT DOCUMENTS

| | | |
|---|---|---|
| JP | 2015-228728 A | 12/2015 |
| WO | 14/076750 A1 | 5/2014 |

\* cited by examiner

POWER SUPPLY DEVICE AND IMAGE FORMING APPARATUS

BACKGROUND OF THE INVENTION

Field of the Invention

The present invention relates to a power supply device and an image forming apparatus that support power savings.

Description of the Related Art

Recently, power savings of electric devices have been advancing, and more and more electric devices have power-saving modes. Under such circumstances, it is required to further improve operation efficiency of power supply devices that supply electric power to the electric devices in the power-saving modes. Meanwhile, there is also a growing need for a power supply device that can supply a large current to an electric device that serves as a load in the power-saving mode. Japanese Patent Laid-Open No. 2013-38941 discloses a power supply capable of temporarily supplying a large current by storing electricity in an electric double layer capacitor.

There is however a trade-off relationship between improving operation efficiency of a power supply device and temporarily supplying a large current to a load. Therefore, there is a need for a power supply device capable of both improving efficiency of the power supply device under a light load and outputting a constant voltage under a heavy load.

SUMMARY OF THE INVENTION

A power supply device includes: a smoothing unit configured to smooth an input current; a boost converter connected to the smoothing unit, the boost converter including a switching element configured to switch the smoothed current, the boost converter configured to boost the smoothed current by switching the switching element and to output a boosted constant voltage; and a switching unit configured to switch to a first path in which the smoothed current is supplied to the boost converter and to a second path in which the smoothed current is supplied to a load without passing through the boost converter, the switching unit including a first switching element to be turned on and a second switching element to be turned off when the first path is formed.

An image forming apparatus includes: an image forming unit configured to form an image; and a power supply device configured to supply electric power to the image forming unit.

Further features of the present invention will become apparent from the following description of exemplary embodiments (with reference to the attached drawings).

DESCRIPTION OF THE EMBODIMENTS

Figure 7:
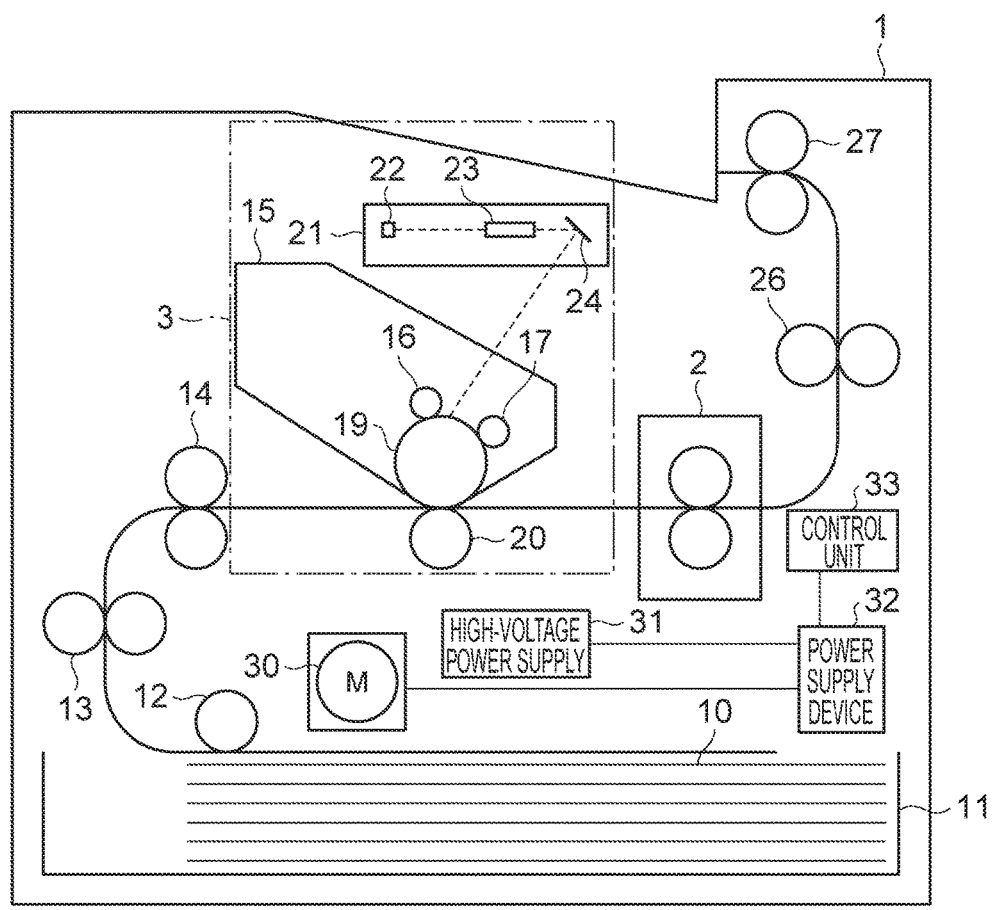
FIG. 7 is a schematic diagram of an image forming apparatus to which the power supply device is applied.

FIG. 7 is a schematic diagram of an image forming apparatus 1 that is one example of an electronic device to which a power supply device 32 of a first embodiment is applied. When a print signal is generated for instructing the image forming apparatus 1 to perform a print operation, a scanner unit 21 that constitutes an image forming unit 3 emits a laser beam modulated in response to image information. The laser beam is scanned on a photosensitive member 19 charged in predetermined polarity by a charge roller 16. This causes an electrostatic latent image to be formed on the photosensitive member 19. Toner is supplied from a developing unit 17 to the formed electrostatic latent image, and a toner image is formed on the photosensitive member 19 in response to the image information. Meanwhile, a recording material (also referred to as recording paper) 10 loaded on a sheet supplying cassette 11, which is a paper feeding unit, is fed one by one by a pickup roller 12, and is conveyed by a roller 13 toward a resist roller 14. The recording material 10 is further conveyed by the resist roller 14 at timing when the toner image on the photosensitive member 19 reaches a transfer nip formed by the photosensitive member and a transfer roller 20. The recording material 10 passing through the transfer nip causes the toner image formed on the photosensitive member 19 to be transferred to the recording material 10. Subsequently, the recording material 10 is heated by a heating device 2, and the toner image is fixed on the recording material 10. The recording material 10 on which the toner image is fixed is discharged to a tray in an upper part of the image forming apparatus 1 by rollers 26 and 27, which are paper discharge units. Note that a motor 30 drives the photosensitive member 19 and the heating device 2. A high-voltage power supply 31 applies a high-voltage bias to the charge roller 16, the developing unit 17, and the transfer roller 20. In the scanner unit 21, a laser beam is generated by a laser device 22, corrected by a lens 23, and reflected and emitted by a mirror 24. The power supply device 32 supplies electric power to electric circuits such as the motor 30, the high-voltage power supply 31, the scanner unit 21, and a control unit 33. The control unit 33 instructs driving timing to each of the units and instructs an operation level.

Figure 1:
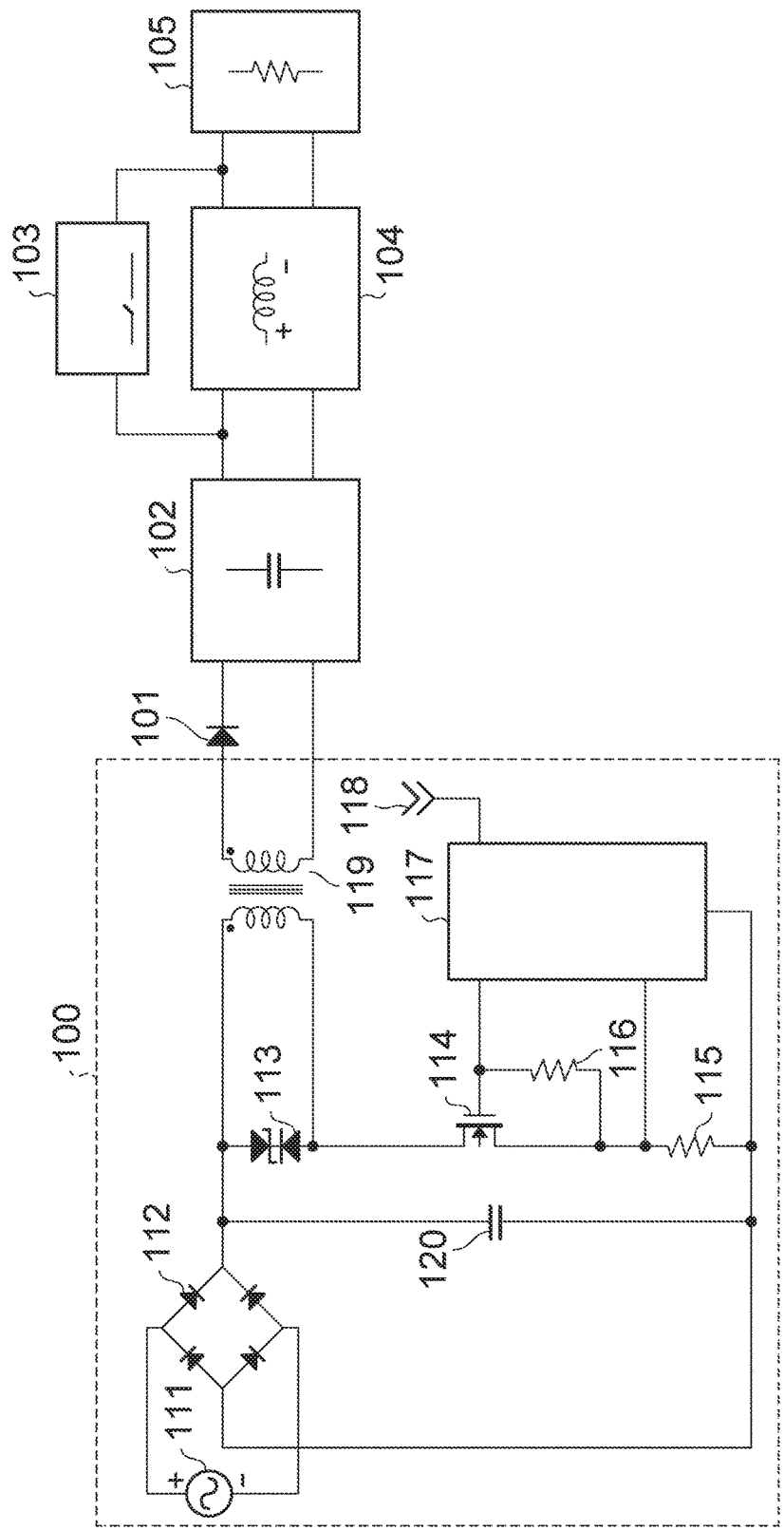
FIG. 1 is a schematic diagram of a power supply device according to a first embodiment.

FIG. 1 is a schematic diagram of the power supply device 32 in the first embodiment. In the power supply device 32, a diode 101 that serves as a rectifying unit for a current supplied from a source power supply 100 rectifies the current, and a smoothing circuit 102 that serves as a smoothing unit smoothes the current. The source power supply 100 is one example of a power supply unit that supplies the current to the smoothing circuit 102 to be described later. A non-isolated converter 104 that serves as a boost converter is connected between the smoothing circuit 102 and a load 105. In addition, a circuit 103 that constitutes a bypass that serves as an openable path is connected in parallel with the non-isolated converter 104. The circuit 103 can supply the current from the smoothing circuit 102 to the load 105 without passing through the non-isolated converter 104.

In the present embodiment, the source power supply 100 is configured to rectify and smooth an alternating-current (AC) voltage input from a commercial AC power source 111 and then supply the rectified and smoothed AC voltage to an isolated transformer. The source power supply 100 uses a switching power supply that converts energy by switching the isolated transformer and outputs a predetermined voltage from a secondary side of the isolated transformer. Note that the source power supply 100 is not limited to a switching power supply, but may be a power supply of another configuration, such as a battery.

The source power supply 100 of the present embodiment will be described. The AC voltage input from the commercial AC power source 111 is connected to a capacitor 120 through a rectifier 112. An FET 114 that serves as a switching unit switches a current that is passed through an isolated transformer 119 that serves as an energy converting unit. A control integrated circuit (IC) 117 that serves as a control unit controls timing and a time period in which a switching element is turned on and off. A resistor 115 is a resistance element for detecting a switching current. A resistor 116 is connected for stabilizing a voltage between a gate terminal and a source terminal of the FET 114. A feedback signal 118 is a signal for maintaining output to the load 105 at a constant voltage. The control circuit 117 controls timing of turning on and off the switching element and an on time period (also referred to as duty ratio) in response to the feedback signal 118. A surge killer 113 is a component that protects the FET 114 by reducing a drain-source voltage of the FET 114 that jumps by switching.

Figure 2:
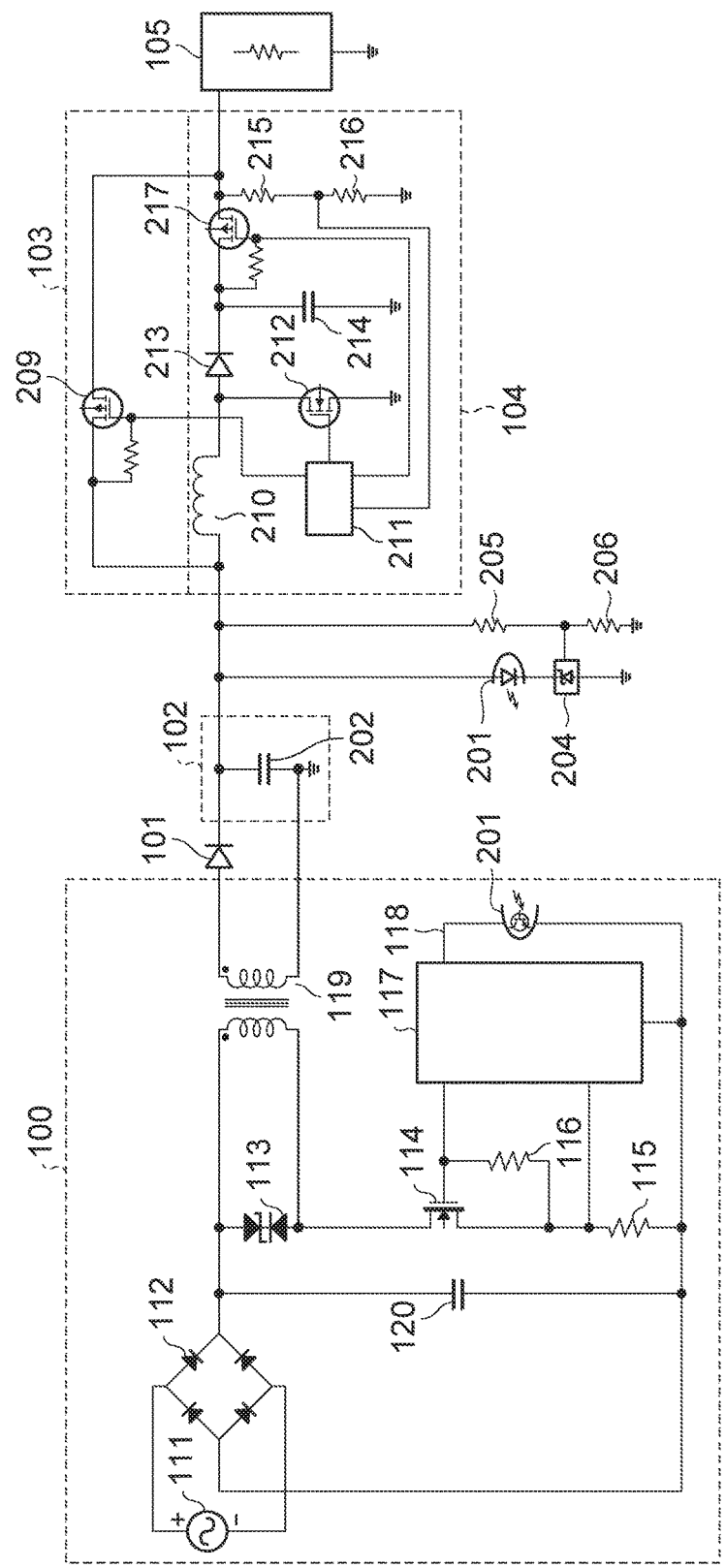
FIG. 2 is a circuit diagram for describing an operation of the power supply device according to the first embodiment.

Next, the power supply device 32 in the present embodiment will be described with reference to FIG. 2. In the power supply device 32, an output voltage from the source power supply 100 is rectified by the diode 101 and smoothed by the smoothing circuit 102. To maintain the output voltage from the smoothing circuit 102 at a constant voltage, information about the output voltage is transmitted to the control circuit 117 as the feedback signal 118 through a photocoupler 201 that serves as a transmission unit. A division ratio of a resistor 205 and a resistor 206 is set such that an Ref terminal of a shunt regulator 204 is at a reference voltage when a desired voltage is output. With this configuration, when the output voltage of the smoothing circuit 102 is lower than a desired voltage, a photodiode side of the photocoupler 201 emits light, and a phototransistor is turned on. While the phototransistor is turned on, the voltage of the feedback signal 118 decreases, and while the phototransistor is turned off, the voltage of the feedback signal 118 increases. Repeating this operation maintains the output voltage of the smoothing circuit 102 at a desired constant value.

Under a light load such as in a power-saving mode, a control circuit 211 turns on an FET 209 that serves as a switching element, which is a circuit 103 that forms a bypass, and turns off an FET 217, which is a connection switching element with the load in a non-isolated converter 104. That is, under a light load, feedback to the source power supply 100 achieves constant voltage output to the load 105. Simultaneously, bypassing the non-isolated converter 104 and passing a current through the circuit 103 with a small loss can increase operation efficiency of the power supply. Meanwhile, under a heavy load such as when an apparatus is operating, the control circuit 211 turns off the FET 209 and turns on the FET 217. Furthermore, the control circuit 211 causes an FET 212 to switch and drive the non-isolated converter 104. The non-isolated converter 104 operates as a boost converter that stores energy in an inductor 210 while the FET 212 is on, and outputs the stored energy through a diode 213 in superimposition on the voltage of the smoothing circuit 102 while the FET 212 is off. The output voltage of the non-isolated converter 104 is divided by resistors 215 and 216 to be fed back to the control circuit 211. That is, under a heavy load, feedback control of the non-isolated converter 104 achieves constant voltage output to the load 105. At this time, as in the power-saving mode, the output voltage of the smoothing circuit 102 is also fed back to the source power supply 100. However, the output voltage of the smoothing circuit 102 may not be a constant voltage, and is allowed to contain a ripple small enough to enable feedback of the non-isolated converter 104 to operate normally. Note that the smoothing circuit 102 in the present embodiment includes a capacitor 202, and a capacitance value of the capacitor 202 may be determined based on the ripple allowable under a light load and a limit of operation of the non-isolated converter 104 under a heavy load.

When a predetermined time period elapses in a state where the image forming apparatus 1 does not perform an image forming operation for forming an image on a recording material and the image forming apparatus 1 stops operation (in a light load state where power consumption is small), the image forming apparatus 1 enters a power saving state and the power supply device also moves to the power-saving mode coinciding therewith. On the other hand, when the image forming apparatus 1 performs the image forming operation (in a heavy load state where power consumption is large), the power-saving mode is canceled and the power supply device moves to a normal operation mode.

As described above, the power supply device 32 includes the smoothing circuit that smoothes the current supplied from the source power supply, the boost converter connected between the smoothing circuit and the load, and the circuit that bypasses the boost converter. The bypass circuit functions as a switching unit that switches to a first path that goes through the boost converter under a heavy load and to a second path that does not go through but bypasses the boost converter under a light load. This allows achievement of both high power supply efficiency under a light load and constant voltage output under a heavy load.

Figure 3:
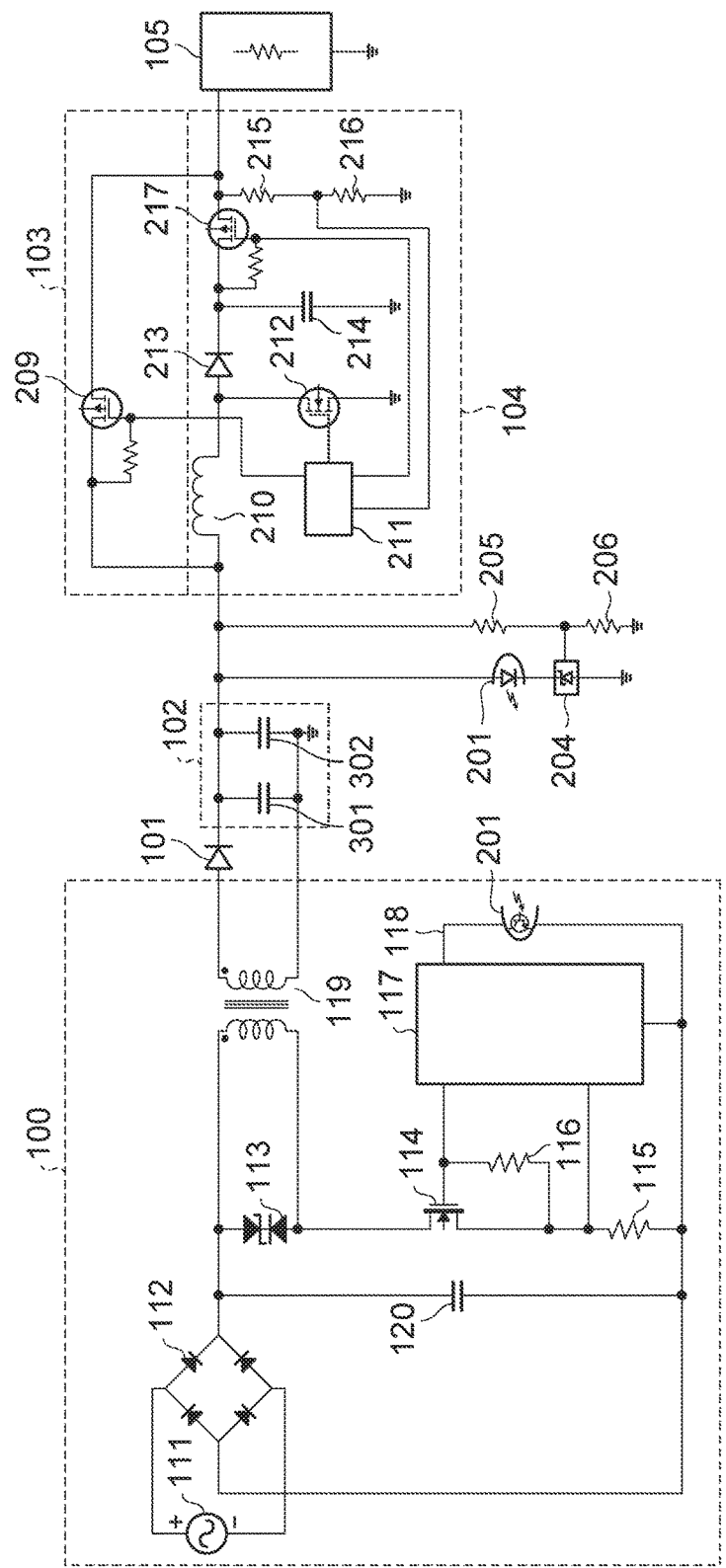
FIG. 3 is a schematic diagram of a power supply device according to a second embodiment.

FIG. 3 is a schematic diagram of a power supply device 32 in a second embodiment. Only a configuration of a smoothing circuit 102 differs between the second embodiment and the first embodiment. Other components are denoted with the same reference symbols, and descriptions thereof will be omitted. In terms of operations, as in the first embodiment, the power supply device 32 is configured such that output to a load 105 goes through a circuit 103 under a light load, and goes through a non-isolated converter 104 under a heavy load. The smoothing circuit 102 of the present embodiment includes a capacitor 301 similar to the capacitor 202 used in the first embodiment, and a high-density large-capacitance capacitor 302 connected in parallel. That is, the smoothing circuit 102 includes a plurality of capacitors. Note that as the high-density large-capacitance capacitor, the following two types of capacitors are applicable.

(1) Electric double-layer capacitor (EDLC)
(2) Lithium ion capacitor (LIC)

When a required amount of current under a heavy load is large, if only the capacitor 202 constitutes the smoothing circuit 102 as in the first embodiment, the size and number of the capacitor 202 will increase, and downsizing and cost savings of the power supply device 32 will be difficult. Therefore, depending on the required amount of current under a heavy load, the capacitor 301 and the high-density large-capacitance capacitor 302 may be used in parallel as in the present embodiment to achieve downsizing and both operation efficiency of the power supply under a light load and constant voltage output under a heavy load.

The high-density large-capacitance capacitor generally has higher equivalent series resistance (ESR) than an electrolytic capacitor or a ceramic capacitor widely used as a capacitor. Charging and discharging a capacitor with high ESR will increase a loss caused by ESR and reduce operation efficiency. Therefore, under a light load when high efficiency is required, the capacitor 301 with ESR smaller than ESR of the high-density large-capacitance capacitor 302 is connected in parallel to minimize charge and discharge of the high-density large-capacitance capacitor 302 with high ESR. A capacitance value of the capacitor 301 is selected such that charge and discharge of the capacitor 301 is dominant at a load level under a light load. This allows decrease in efficiency of the high-density large-capacitance capacitor 302 caused by ESR to be reduced.

As described above, in particular, in addition to the configuration of the first embodiment, by connecting the high-density large-capacitance capacitor 302 in parallel together with the capacitor 301 as the smoothing circuit 102, the present embodiment provides the following effects.

Since charge and discharge of the capacitor 301 with ESR smaller than ESR of the high-density large-capacitance capacitor 302 is dominant, operation efficiency can be increased under a light load. On the other hand, under a heavy load, energy stored in the high-density large-capacitance capacitor 302 can maintain constant voltage output to the load 105. Thus, both high efficiency under a light load and constant voltage output under a heavy load can be achieved. Downsizing or cost reduction can be achieved depending on the required load current.

Figure 4:
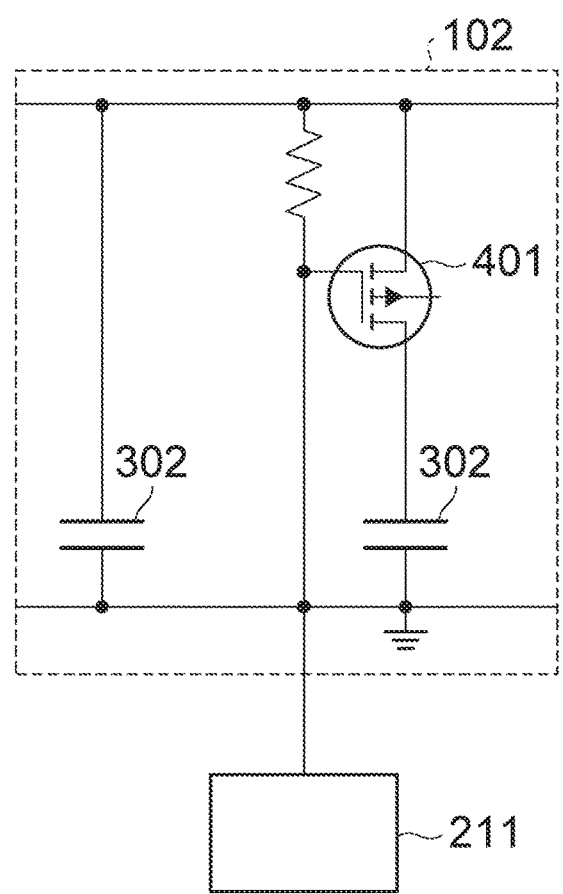
FIG. 4 is a diagram illustrating an example of a smoothing circuit according to a third embodiment.

In the above description, the capacitor 301 and the high-density large-capacitance capacitor 302 are connected. To prevent decrease in efficiency of the high-density large-capacitance capacitor 302 due to ESR, however, the smoothing circuit 102 may have a configuration in which an FET 401 is connected as a switch to turn on and off a charge-and-discharge path to the high-density large-capacitance capacitor 302 as illustrated in FIG. 4. By turning off the FET 401 under a light load when high efficiency is required and turning on the FET 401 under a heavy load, the configuration of FIG. 4 can achieve high efficiency under a light load and constant voltage output under a heavy load.

Note that in a case where connection of the high-density large-capacitance capacitor 302 is turned on and off, the voltage will decrease due to self-discharge or the like when connection is turned off. When connection is on, the voltage is to be equal to or higher than a voltage at which at least the non-isolated converter 104 can operate. Therefore, when an off time period is long, actions may be taken such as charging the high-density large-capacitance capacitor 302 by turning on the connection regularly in order to keep the voltage equal to or greater than a certain level.

Figure 5:
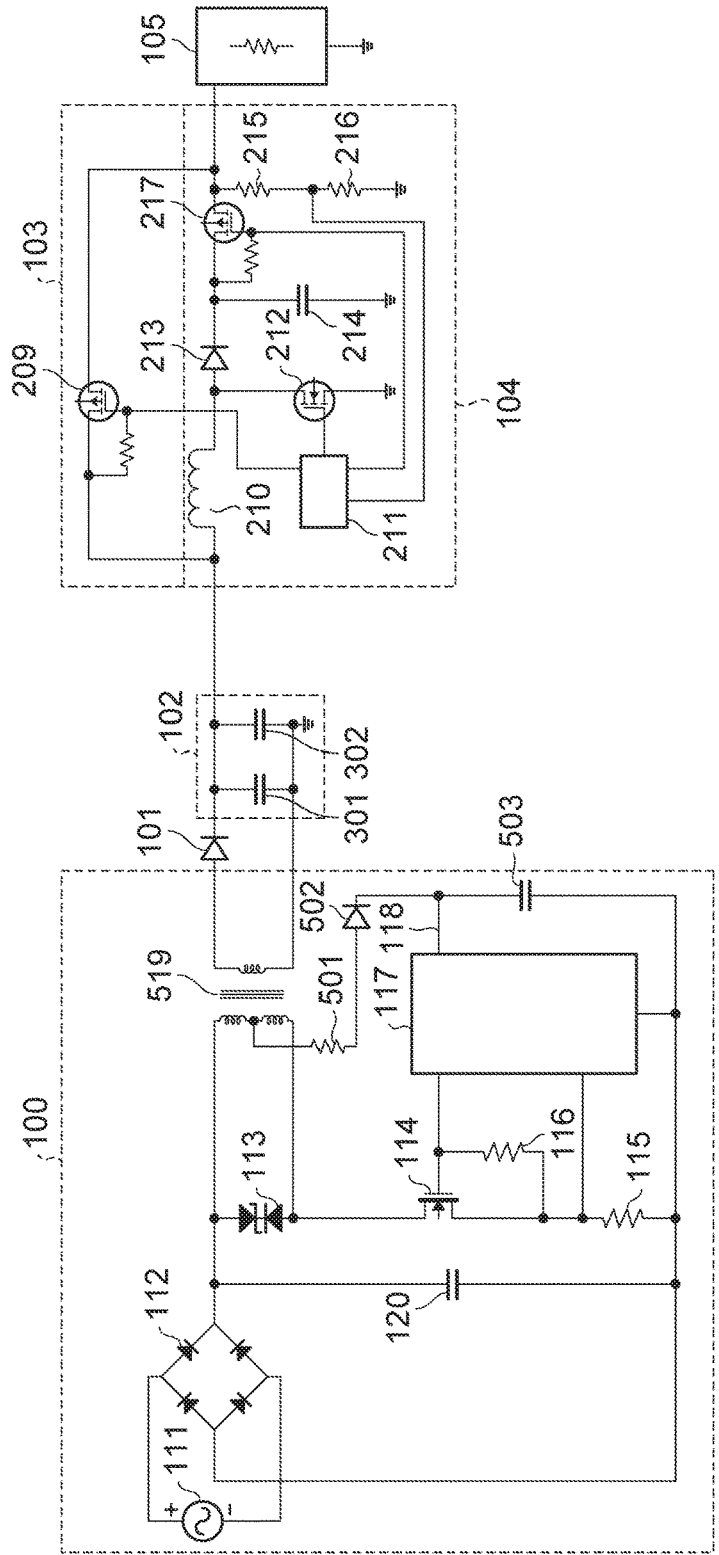
FIG. 5 is a schematic diagram of a power supply device according to the third embodiment.

FIG. 5 is a schematic diagram of a power supply device 32 in a third embodiment. A smoothing circuit 102, a circuit 103, and a non-isolated converter 104 in the present embodiment, which are similar to the smoothing circuit 102, the circuit 103, and the non-isolated converter 104 in the second embodiment (FIG. 3), are denoted with the same reference symbols, and descriptions thereof will be omitted. The present embodiment does not use output voltage information from the smoothing circuit 102 as a feedback signal to a source power supply 100, but uses information about a voltage of primary side auxiliary winding of an isolated transformer 519 that is substantially linked to the output voltage of the smoothing circuit 102. Generally, a relationship between the voltage induced in the auxiliary winding and the output voltage of the smoothing circuit 102 varies depending on a state of a load 105. However, a voltage applied to the load 105 under a heavy load, which is regulated by the non-isolated converter 104, does not vary depending on the state of the load 105 (or variation is extremely small) in a heavy load state. That is, when a level of a feedback signal 118 is adjusted such that the output voltage of the smoothing circuit 102 under a light load becomes a desired value, constant voltage output to the load 105 is possible both under a light load and under a heavy load. In the present embodiment, a resistance value of a resistor 501 is set as a method of adjusting a level of the feedback signal 118. Note that a circuit in which a resistance element is connected in parallel with a capacitor 503 may be used. This configuration can achieve high efficiency under a light load and constant voltage output under a heavy load in a smaller size and at a lower price than in the second embodiment.

Figure 6:
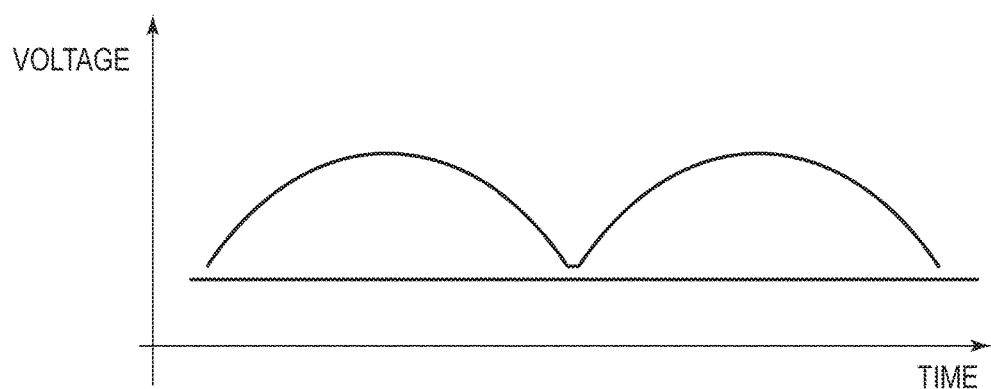
FIG. 6 is a diagram for describing a voltage applied to a capacitor according to the third embodiment.

As a circuit configuration, it is also possible to eliminate the capacitor 120 or to reduce capacitance of the capacitor 120. Such a circuit can be made in a small size and at a low price. Here, the capacitor 120 has a function of smoothing output of a rectifier 112. Smaller capacitance of the capacitor 120 cannot sufficiently smooth the output, resulting in a voltage from the capacitor 120 as illustrated in FIG. 6. In a portion of a low pulsating voltage, electric power sent to a secondary side by an isolated transformer 519 is limited. Under a light load, however, when the capacitor 120 has capacitance that can maintain output of the smoothing circuit 102 at a desired voltage even in the portion of the low pulsating voltage, constant voltage output to the load 105 is possible both under a light load and under a heavy load. Thus, by not using the output voltage information from the smoothing circuit 102 directly so as to satisfy part of conditions and eliminating the capacitor 120 or reducing the capacitance thereof, the circuit can be made in a small size and at a low price. Also, high efficiency can be achieved under a light load and constant voltage output can be achieved under a heavy load.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-237118, filed Dec. 6, 2016, which is hereby incorporated by reference herein in its entirety.

What is claimed is:

1. A power supply device comprising:
    a smoothing unit configured to smooth an input current;
    a boost converter connected to the smoothing unit, the boost converter including a switching element configured to switch the smoothed current, the boost converter configured to boost the smoothed current by switching the switching element and to output a boosted constant voltage; and
    a switching unit configured to switch to a first path in which the smoothed current is supplied to the boost converter and to a second path in which the smoothed current is supplied to a load without passing through the boost converter, the switching unit including a first switching element to be turned on and a second switching element to be turned off when the first path is formed,
    wherein the smoothing unit is a circuit including at least one capacitor and a high-density large-capacitance capacitor connected in parallel, and wherein the high-density large-capacitance capacitor includes one of an electric double layer capacitor and a lithium ion capacitor.

2. The power supply device according to claim 1, wherein under a first load when an amount of current consumed by the load is large, the switching unit switches to the first path, and under a second load when the amount of current of the load is smaller than under the first load, the switching unit switches to the second path.

3. The power supply device according to claim 1, wherein when the second path is formed, the switching unit turns off the first switching element and turns on the second switching element.

4. The power supply device according to claim 1, wherein the smoothing unit is a circuit including a capacitor.

5. The power supply device according to claim 1, further comprising:
a power supply unit configured to supply the current to the smoothing unit; and
a transmission unit configured to transmit output voltage information of the smoothing unit to the power supply unit.

6. The power supply device according to claim 5, wherein the power supply unit includes an isolated transformer, a switching element for switching the isolated transformer, and a control unit that controls an operation of the switching element, and the control unit controls the operation of the switching element by using voltage information on a primary side of the isolated transformer.

7. A power supply device comprising:
a smoothing unit configured to smooth an input current;
a boost converter connected to the smoothing unit, the boost converter including a switching element configured to switch the smoothed current, the boost converter configured to boost the smoothed current by switching the switching element and to output a boosted constant voltage; and
a switching unit configured to switch to a first path in which the smoothed current is supplied to the boost converter and to a second path in which the smoothed current is supplied to a load without passing through the boost converter, the switching unit including a first switching element to be turned on and a second switching element to be turned off when the first path is formed,
wherein under a first load when an amount of current consumed by the load is large, the switching unit switches to the first path, and under a second load when the amount of current of the load is smaller than under the first load, the switching unit switches to the second path,
wherein the smoothing unit is a circuit including a plurality of capacitors connected in parallel, the capacitors each having different equivalent series resistance (ESR).

8. An image forming apparatus comprising:
an image forming unit configured to form an image; and
a power supply device configured to supply electric power to the image forming unit,
the power supply device comprising:
a smoothing unit configured to smooth an input current;
a boost converter connected to the smoothing unit, the boost converter including a switching element configured to switch the smoothed current, the boost converter configured to boost the smoothed current by switching the switching element and to output a boosted constant voltage; and
a switching unit configured to switch to a first path in which the smoothed current is supplied to the boost converter and to a second path in which the smoothed current is supplied to a load without passing through the boost converter, the switching unit including a first switching element to be turned on and a second switching element to be turned off when the first path is formed,
wherein the smoothing unit is a circuit including at least one capacitor and a high-density large-capacitance capacitor connected in parallel, and
wherein the high-density large-capacitance capacitor includes one of an electric double layer capacitor and a lithium ion capacitor.

9. The image forming apparatus according to claim 8, wherein the image forming apparatus switches to a first load state in which an image forming operation is performed and to a second load state in which the image forming operation is stopped, the image forming apparatus switches to the first path in the first load state, and the image forming apparatus switches to the second path in the second load state.

10. The image forming apparatus according to claim 8, wherein when the second path is formed, the switching unit turns off the first switching element and turns on the second switching element.

11. The image forming apparatus according to claim 8, wherein the smoothing unit is a circuit including a capacitor.

12. The image forming apparatus according to claim 8, wherein the device further comprises:
a transmission unit configured to transmit output voltage information of the smoothing unit to the power supply unit.

13. The image forming apparatus according to claim 12, wherein the power supply unit includes an isolated transformer, a switching element for switching the isolated transformer, and a control unit that controls an operation of the switching element, and the control unit controls the operation of the switching element by using voltage information on a primary side of the isolated transformer.

14. An image forming apparatus comprising:
an image forming unit configured to form an image; and
a power supply device configured to supply electric power to the image forming unit,
the power supply device comprising:
a smoothing unit configured to smooth an input current;
a boost converter connected to the smoothing unit, the boost converter including a switching element configured to switch the smoothed current, the boost converter configured to boost the smoothed current by switching the switching element and to output a boosted constant voltage; and
a switching unit configured to switch to a first path in which the smoothed current is supplied to the boost converter and to a second path in which the smoothed current is supplied to a load without passing through the boost converter, the switching unit including a first switching element to be turned on and a second switching element to be turned off when the first path is formed,
wherein the image forming apparatus switches to a first load state in which an image forming operation is performed and to a second load state in which the image forming operation is stopped, the image forming apparatus switches to the first path in the first load state, and the image forming apparatus switches to the second path in the second load state, wherein the smoothing unit is a circuit including a plurality of capacitors connected in parallel, the capacitors each having different ESR.

\* \* \* \* \*